Aug. 3, 1954  B. J. MURPHY  2,685,464

AXIAL CONTACT SEAL

Filed Oct. 23, 1947

Inventor
Bernard J. Murphy
by
Attorney

Patented Aug. 3, 1954

2,685,464

UNITED STATES PATENT OFFICE 2,685,464

AXIAL CONTACT SEAL

Bernard J. Murphy, Springfield, Ill., assignor to Allis-Chalmers Manufacturing Company, Milwaukee, Wis., a corporation of Delaware Application October 23, 1947, Serial No. 781,668

10 Claims. (Cl. 286—11)

This invention relates to rotary seals of the axial contact type, that is, seals of the type in which an axially movable sealing ring has a sealing surface at one side thereof for cooperative engagement with a complementary sealing surface, and in which a resilient backing unit for the sealing ring is arranged at the other side thereof and urges the sealing ring axially into cooperative engagement with said complementary sealing surface.

U. S. Patent 2,265,951 granted on December 9, 1941 to J. A. Miner for Rotary Shaft Seal, discloses a precision seal of the above mentioned character which is practically leak proof, and for the satisfactory operation of such a precision seal it is important that the sealing ring be accurately centered with respect to the axis on which the sealing ring and the complementary sealing surface are rotatable relative to each other. In other words, it is important that upon rotation of the sealing ring relative to the complementary sealing surface, or vice versa, axial contact between the sealing ring and the complementary sealing surface will be limited to an annular area of accurately defined radial width, which would not be the case if the sealing ring were permitted to have some radial play relative to the complementary sealing surface.

The axially movable sealing ring is usually locked against rotation relative to its supporting structure which is associated with one of the relatively rotatable parts between which the seal is installed, the complementary sealing surface being formed on the other of said relatively rotatable parts. The torque to which the sealing ring becomes subjected and which tends to turn the sealing ring relative to its support may, under certain conditions, reach an appreciable magnitude, for instance in installations, such as track rollers for crawler tractors, where caked mud and ice are apt to transmit considerable drag to the sealing ring upon application of driving torque to one of the relatively rotatable parts. Under these conditions it is necessary to provide an adequate locking connection between the sealing ring and its supporting structure which will be sufficiently sturdy to withstand relatively high circumferential loads.

On the other hand, the sealing ring should be movable axially relative to its supporting structure without objectionable resistance which would interfere with the proper functioning of the resilient backing unit or result in an erratic functioning of said backing unit.

It is further desirable that the sealing ring be laterally tiltable relative to its support, at least to a slight extent, so that it can adjust itself to proper contact with the complementary sealing surface if the latter should not accurately coincide with a plane at exactly right angles to the axis of rotation of the relatively rotatable parts.

The foregoing requirements are believed to have not been met in an entirely satisfactory manner by seals of the axial contact type as heretofore constructed.

Generally, it is an object of the invention to provide an improved axial contact seal, and more particularly one that will meet all of the mentioned requirements in a practical, economical and fully satisfactory manner.

More specifically, it is an object of the invention to provide an improved precision seal of the type disclosed in the hereinbefore mentioned Miner patent.

Another object of the invention is to provide an improved mounting of the axially shiftable sealing ring in a precision seal of the axial contact type and which improved mounting will afford, first, practically frictionless axial back and forth movement of the sealing ring; second, positive locking of the axially shiftable sealing ring against rotation; third, self-adjustment of the sealing ring to laterally inclined positions; and fourth, positive and accurate centering of the axially shiftable sealing ring relative to the axis on which the sealing ring and the complementary sealing member are rotatable relative to each other.

The foregoing and other objects and advantages are attained by the construction and arrangement of parts according to the present invention, various novel features of which will be apparent from the description herein and the accompanying drawing disclosing an embodiment of the invention, and will be more particularly pointed out in the appended claims.

Referring to the drawing.

Figure 1:
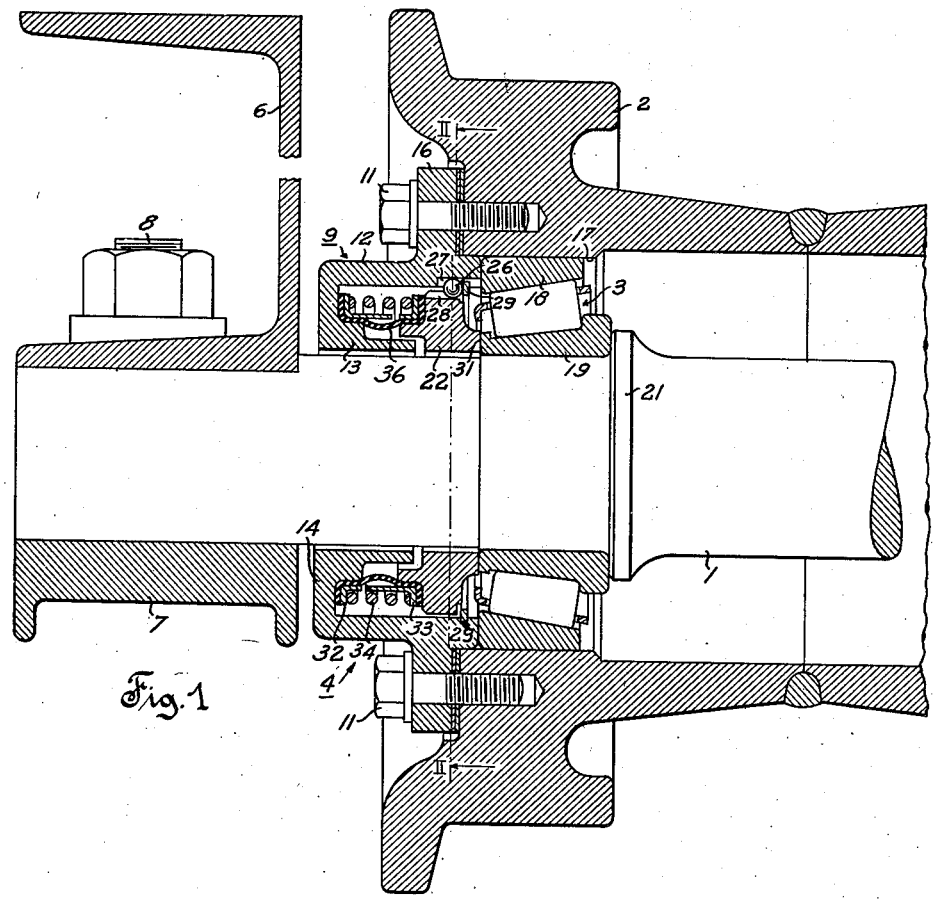
Fig. 1 is a sectional view of part of a track roller installation for crawler tractors.

The part of the roller installation shown in Fig. 1 comprises a shaft part 1, a wheel part 2, a conical roller bearing 3, and a seal unit generally designated by the reference character 4. As shown at the left of Fig. 1, a channel 6 is secured to an end portion of the shaft part 1 by means of a bracket 7 which embraces the shaft part 1 and which is bolted to the lower flange of the channel 6, as indicated at 8.

The channel 6 forms one of a pair of longitudinal side members of a conventional track frame, and it will be understood that Fig. 1 illustrates only one-half of a track roller installation on such a track frame. The present invention is concerned more particularly with the seal unit 4, and a detailed description of the other half of the track roller installation is therefore believed unnecessary. Suffice it to say, that the seal unit incorporating the present invention may be used in either or both halves of the installation, and that it may be used in other installations which incorporate a rotary seal of the axial contact type.

Referring to the seal unit 4, an annular cap member 9 is secured to the wheel part 2 at the axially outer side of the latter by means of a circumferential series of cap screws 11. The cap member 9 comprises an axially extending circumferential outer wall part 12, an axially extending circumferential inner wall part 13, a radial wall part 14 connecting the circumferential wall parts 12 and 13 at their axially outer ends, and a flange part 16 extending radially from the outer wall part 12. The circumferential wall part 12 of the cap member 9 is extended axially a short distance beyond the axially inner side of the flange part 16 to form an annular lip for centering the cap member 9 on the wheel part 2, the lip having a smooth cylindrical outer surface which is fitted into a cylindrical bore 17 of the roller 2. The annular lip of the cap member 9 also serves as an axial abutment for the outer race 18 of the roller bearing 3 which is fitted into the cylindrical bore 17 of the wheel part 2.

The inner race 19 of the roller bearing 3 is fitted upon the shaft part 1 and seated axially against an annular thrust shoulder 21 which is integrally formed with the shaft part 1 at the axially inner side of the bearing race 19. The axially outer face of the inner race 19 is accurately finished, hardened and lapped to form a sealing surface on the shaft part 1. A sealing ring 22 made of steel is mounted within the cap member 9 and has an accurately finished, hardened and lapped end face 31 for cooperative engagement with the mentioned sealing surface on the shaft 1, the latter surface forming a complementary sealing surface for the sealing ring 22.

Figure 2:
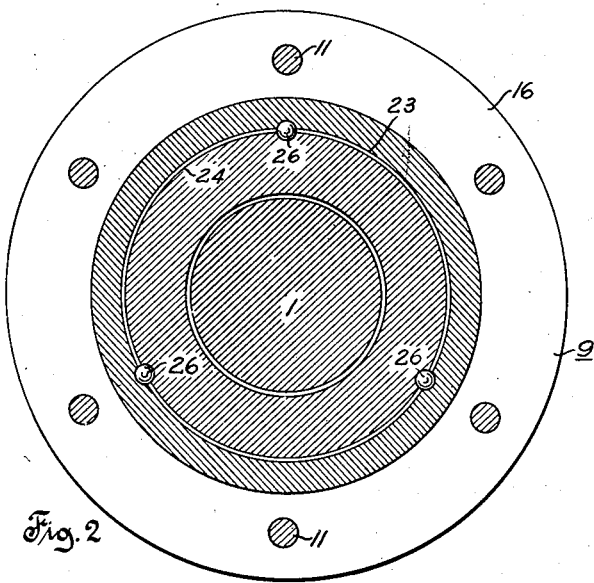
Fig. 2 is a section on line II—II of Fig. 1.

The circumferential wall portion 12 has a cylindrical inner surface 23 (Fig. 2), and the sealing ring 22 has a cylindrical outer surface 24 of appreciably smaller diameter than the cylindrical surface 23 so that in the assembled condition of the seal, as shown in Fig. 1, the cylindrical wall portion 12 of the cap member will surround the sealing ring 22 in radially spaced relation thereto. A circumferential series of antifriction bodies in the form of three steel balls 26 are operatively interposed between the sealing ring 22 and the cap member 9 for centering the sealing ring within the cap member in axially movable relation thereto. In the embodiment of the invention as shown in the drawing, a circumferential series of axially extending substantially semicylindrical grooves 27 for cooperative engagement, respectively, with the balls 26, are formed on the peripheral wall portion 12 of the cap member 9, and another circumferential series of axially extending substantially semicylindrical grooves 28 for cooperative engagement, respectively, with the balls 26 are formed at the outer periphery of the sealing ring 22. In the assembled condition of the seal, as shown in Figs. 1 and 2, the grooves 27 on the cap member 9 register, respectively, with the grooves 28 on the sealing ring, and each pair of grooves 27 and 28 accommodates one of the balls 26. The depth of the grooves 27 and 28 and the diameters of the balls 26 are so proportioned that in the assembled condition of the unit, as shown in Fig. 1, the sealing ring will be supported by the balls 26 on the cap member 9 in accurately centered, and axially movable relation to the latter.

A snap ring 29 is mounted on the cap member 9 in an annular groove at the axially inner end of the cylindrical wall portion 12 and serves to limit axial movement of the balls 26 toward the inner end of the cap member 9. The snap ring 29 also provides a stop which may be engaged by the sealing ring 22 when the sealing unit is removed from the wheel part 2, as will be explained more fully hereinbelow.

A pressure unit for the sealing ring 22 is operatively interposed between the radial wall part 14 of the cap member 9 and the rear face of the sealing ring 22, the purpose of the pressure unit being to urge the sealing ring 22 into engagement with the inner race 19 of the roller bearing 3 and to maintain a proper sealing pressure between the sealing surface 31 of the sealing ring 22 and the complementary sealing surface on the bearing race 19.

The resilient pressure unit comprises a pair of angle rings 32 and 33, a coil spring 34 and a seal boot 36. The angle rings 32 and 33 and the coil spring 34 are assembled in conformity with well known principles to form an axially resilient skeleton structure for the seal boot 36. The seal boot consists of an annular channel of rubber like material, and is wrapped around the skeleton structure at the inner periphery of the latter with the flanges of the channel in axially confronting relation to the axial outer sides of the skeleton rings 32 and 33. In the operative condition of the seal unit 4, as shown in Fig. 1, the coil spring 34 is in a state of axial compression which subjects the sealing ring 22 to axial pressure in the direction toward the roller bearing 3.

Figure 3:
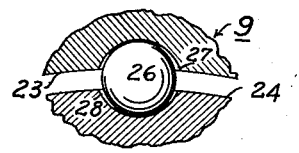
Fig. 3 is an enlarged detail view, in section, on line II—II of Fig. 1.

The inner periphery of the sealing ring 22 is radially spaced from the shaft part 1, and the balls 26 permit substantially frictionless movement of the sealing ring axially of the cap member 9 so that the sealing ring may readily move into sealing engagement with the inner race 19 under the action of the coil spring 34. Referring to Fig. 3, the grooves 27 on the cap member 9 and the grooves 28 on the sealing ring 22 afford axially extending bearing surfaces on which the balls 26 are adapted to roll to accommodate axial back and forth movement of the sealing ring 22 relative to the cap member 9.

As shown in Fig. 2, the balls 26 are equally spaced from each other circumferentially of the sealing ring 22, and if the circumferential spacings of the grooves 27 on the cap member 9 do not accurately match the circumferential spacings of the grooves 28 on the sealing ring 22, due to slight manufacturing variations, the balls are apt to bind or wedge between the side surfaces of the grooves 27 and 28. In order to avoid such binding or wedging of the balls the radii of curvature of the grooves 27 and 28 are made slightly larger than the radius of the cooperating ball 26. In Fig. 3 this relation between the curvatures of the grooves 27 and 28 and of the ball 26 has been exaggerated for purposes of illustration.

The mounting of the sealing ring 22 on the cap member 9 in the described manner not only centers the sealing ring 22 accurately with respect to the cap member 9 in axially shiftable relation thereto, but it also permits slight lateral tilting of the sealing ring 22 relative to the cap member 9 so that the sealing ring can adjust itself to proper contact with the complementary sealing surface on the bearing race 19 if said complementary sealing surface should not accurately coincide with a plane at exactly right angles to the axis of rotation of the wheel part 2, as for instance due to deflection of the shaft 1, or if the cap member 9 should be cocked relative to said plane.

It will further be noted that the balls 26 cooperate with the side surfaces of the grooves 27 on the cap member 9, and with the side surfaces of the grooves 28 on the sealing ring 22, to efficiently lock the sealing ring against rotation relative to the cap member 9. For clearance purposes, the axially extending inner wall 13 of the cap member 9 is radially spaced from the surface of the shaft part 1, and in operation of the track roller unit a certain amount of foreign matter may work into the space between the shaft and the cap member and accumulate at the inner periphery of the sealing ring 22. Such foreign matter, for instance in the form of mud or water, is apt to solidify around the inner periphery of the sealing ring 22 and then form a more or less rigid bond between the sealing ring and the shaft 1. However, the balls 26 are fully adequate to transmit sufficient torque to the sealing ring 22 upon rotation of the wheel part 2 relative to the shaft part 1 so as to free the sealing ring from any bond which may have been formed by caked mud or ice between the sealing ring and the shaft. It will be noted that the locking of sealing ring 22 by the balls 26 against rotation relative to the cap member 9 also relieves the resilient pressure unit from undesirable or harmful torsional or twisting strains during rotation of the wheel relative to the shaft.

The entire seal unit comprising the cap member 9, the sealing ring 22, the balls 26, the snap ring 29, and all parts of the resilient pressure unit may be readily assembled independently of the wheel and shaft, and the assembled seal unit may be readily installed in cooperative association with the roller bearing. For purposes of disassembly, the shaft part 1 may be detached from the side channels 6 of the track frame, the cap screws 11 which retain the sealing unit on the wheel part 2 may be removed, and the sealing unit will then be free for axial removal, as an assembled unit, from the shaft part 1 and from the wheel part 2. The coil spring 34 has an inherent tendency to push the sealing ring 22 out of the cap member 9, and when the seal unit is removed from the wheel part 2, the snap ring 29 will be engaged by the sealing ring 22 under the pressure of the coil spring 34. As a result, all parts of the seal unit will remain in assembled condition when the cap screws 11 are removed and the seal unit is detached from the shaft part 1 and wheel part 2.

In general terms, the herein disclosed sealing device is of the type in which a sealing ring structure is resiliently mounted for axial back and forth movement on and connected in sealed relation with a supporting structure, the sealing ring and supporting structures in the illustrated embodiment of the invention being represented by the sealing ring 22 and the cap member 9, respectively. The device comprises pairs of registering recesses at points spaced from each other circumferentially of said structures and each pair presenting an axially elongated, radial and circumferential load transmitting bearing surface on one of said structures, as for instance the groove surface 28, a radial and circumferential load transmitting bearing surface on the other of said structures, as for instance the groove surface 27; roller means 26 operatively interposed between registering pairs of said bearing surfaces in radial and circumferential load transmitting and in rolling relation to said ring and supporting structures; and stop means for preventing movement of said roller means out of radial and circumferential load transmitting engagement with said ring and supporting structures. In the embodiment of the invention as shown in Fig. 1, one of said stop means is afforded by the portion of the snap ring 29 at the right of the ball 26, the snap ring forming a first abutment in the path of forward rolling movement of each of the roller means 26. On the other hand, the blind end of the groove 27 at the left of the ball 26 in Fig. 1 also provides a stop means for preventing movement of the ball 26 out of radial and circumferential load transmitting engagement with the ring and supporting structures, the blind end of each of the grooves 27 forming a second abutment in the path of rearward rolling movement of each of the roller means 26.

It will be noted that each pair of registering recesses, in addition to presenting an axially elongated, radial and circumferential load transmitting bearing surface on one of the ring and supporting structures and a radial and circumferential load transmitting bearing surface on the other of said structures, presents an axial load transmitting bearing surface formed on one of said structures so as to obstruct one axial end of the space between said radial and circumferential load transmitting bearing surfaces while the ring structure occupies a predetermined axially adjusted operative position relative to the supporting structure, as shown in Fig. 1. More specifically, each pair of registering recesses further presents another axial load transmitting bearing surface formed on one of the ring and supporting structures so as to additionally obstruct the other axial end of the space between said radial and circumferential load transmitting bearing surfaces while said ring structure occupies said predetermined axially adjusted position relative to the supporting structure. The roller means 26 are operatively mounted on the radial and circumferential load transmitting bearing surfaces and in abuttable relation to said axial load transmitting bearing surface or surfaces, so as to center the ring structure in rotatively locked and axially shiftable condition on the supporting structure.

It should be understood that it is not intended to limit the invention to the particular forms and details described hereinabove and that the invention includes such other forms and modifications as are embraced by the scope of the appended claims.

It is claimed and desired to secure by Letters Patent:

1. A sealing device of the type in which a sealing ring structure is resiliently mounted for axial back and forth movement on and connected in sealed relation with a supporting structure, said device comprising substantially semicylindrical first grooves formed at circumferentially spaced points of said ring structure so as to extend axially of the latter, substantially semicylindrical second grooves formed on said supporting structure in radially registering relation, respectively, with said first grooves, antifriction balls operatively interposed between registering pairs of said first and second grooves in radial and circumferential load transmitting and in rolling relation to said ring and supporting structures, so as to mount said ring structure in positively and accurately centered, rotatively locked, axially shiftable and laterally tiltable condition on said supporting structure, and stop means for preventing movement of said antifriction balls out of radial and circumferential load transmitting engagement with said ring and supporting structures, the substantially semicylindrical surfaces presented by said first and second grooves having larger radii of curvature than said antifriction balls, so as to provide side clearance, circumferentially of said ring structure, between said balls and the adjacent longitudinal groove edges.

2. A sealing device of the type in which a sealing ring structure is resiliently mounted for axial back and forth movement on and connected in sealed relation with a supporting structure, said device comprising a series of axially elongated radial and circumferential load transmitting bearing surfaces formed by radial recesses at circumferentially spaced points in one of said structures and in radially confronting relation to the other of said structures, another series of radial and circumferential load transmitting bearing surfaces formed by radial recesses in the other of said structures and in radially registering relation with said axially elongated bearing surfaces, respectively, roller means operatively interposed between registering pairs of said bearing surfaces in radial and circumferential load transmitting and in rolling relation to said ring and supporting structures, so as to mount said ring structure in positively and accurately centered, rotatively locked, axially shiftable and laterally tiltable condition on said supporting structure, and stop means for preventing movement of said roller means out of radial and circumferential load transmitting engagement with said ring and supporting structures.

3. A sealing device as set forth in claim 2, in which said stop means comprise a first abutment in the path of forward rolling movement of each of said roller means and a second abutment in the path of rearward rolling movement of each of said roller means.

4. A sealing device of the type in which a sealing ring structure is resiliently mounted for axial back and forth movement on and connected in sealed relation with a supporting structure, said device comprising pairs of registering recesses at points spaced from each other circumferentially of said structures and each pair presenting an axially elongated, radial and circumferential load transmitting bearing surface on one of said structures, a radial and circumferential load transmitting bearing surface on the other of said structures, and an axial load transmitting bearing surface formed on one of said structures so as to obstruct one axial end of the space between said radial and circumferential load transmitting bearing surfaces while said ring structure occupies a predetermined axially adjusted operative position relative to said supporting structure; and roller means operatively mounted on said radial and circumferential load transmitting bearing surfaces and in abuttable relation to said axial load transmitting bearing surface of each pair of said registering recesses, so as to mount said ring structure in positively and accurately centered, rotatively locked, axially shiftable and laterally tiltable condition on said supporting structure.

5. A sealing device as set forth in claim 4, in which each pair of registering recesses further presents another axial load transmitting bearing surface formed on one of said structures so as to obstruct the other axial end of the space between said radial and circumferential load transmitting bearing surfaces while said ring structure occupies said predetermined axially adjusted position relative to said supporting structure; and in which said roller means are operatively mounted on said radial and circumferential load transmitting bearing surfaces in abuttable relation to both of said axial load transmitting bearing surfaces of each pair of registering recesses.

6. A sealing device as set forth in claim 4, in which each pair of registering recesses presents an axially elongated, radial and circumferential load transmitting bearing surface on said ring structure, and an axially elongated radial and circumferential load transmitting bearing surface on said supporting structure.

7. A sealing device as set forth in claim 4, in which said roller means are afforded by antifriction balls corresponding in number to the number of registering pairs of recesses, one antifriction ball being operatively interposed between each of said pairs of registering recesses.

8. A sealing device of the type in which a sealing ring structure is resiliently mounted for axial back and forth movement on and connected in sealed relation with a supporting structure, said device comprising pairs of registering recesses at points spaced from each other circumferentially of said structures and each pair presenting an axially elongated, radial and circumferential load transmitting bearing surface on one of said structures, a radial and circumferential load transmitting bearing surface on the other of said structures, and a pair of axial load transmitting bearing surfaces formed on and spaced from each other axially of one of said structures so as to obstruct the axially opposite ends of the space between said radial and circumferential load transmitting bearing surfaces while said ring structure occupies a predetermined axially adjusted operative position relative to said supporting structure; and roller means operatively mounted on said radial and circumferential load transmitting bearing surfaces and intermediate said axial load transmitting bearing surfaces of each pair of said registering recesses, so as to mount said ring structure in positively and accurately centered, rotatively locked, axially shiftable and laterally tiltable condition on said supporting structure.

9. A sealing device as set forth in claim 8, in which said axially elongated, radial and circumferential load transmitting bearing surfaces are formed on said ring structure, and in which said axial load transmitting bearing surfaces are formed on said supporting structure.

10. A sealing device of the type in which a sealing ring structure is resiliently mounted for axial back and forth movement on and connected in sealed relation with a supporting structure, said device comprising pairs of registering recesses at points spaced from each other circumferentially of said structures and each pair presenting an axially elongated, radial and circumferential load transmitting bearing surface on one of said structures, and a radial and circumferential load transmitting bearing surface on the other of said structures, one antifriction body operatively disposed between the radial and circumferential load transmitting bearing surfaces of each pair of registering recesses so as to mount said ring structure in positively and accurately centered, rotatively locked, axially shiftable and laterally tiltable condition on said supporting structure, and stop means for preventing movement of said antifriction bodies out of radial and circumferential load transmitting engagement with said ring and supporting structures.

References Cited in the file of this patent

UNITED STATES PATENTS

| Number | Name | Date |
|---|---|---|
| 851,728 | Bayrer | Apr. 30, 1907 |
| 1,208,252 | Westinghouse | Dec. 12, 1916 |
| 1,763,332 | Sykes | June 10, 1930 |
| 1,864,683 | Varden | June 28, 1932 |
| 1,972,779 | Kradoska | Sept. 4, 1934 |
| 2,157,597 | Dupree | May 9, 1939 |
| 2,250,348 | Beier | July 22, 1941 |
| 2,358,830 | Schick | Sept. 26, 1944 |
| 2,399,764 | Schilling | May 7, 1946 |
| 2,403,298 | Payne | July 2, 1946 |
| 2,432,694 | Snyder | Dec. 16, 1947 |